Aug. 5, 1952 — G. I. GOODWIN — 2,605,867
STRUCTURAL MEMBER
Filed May 10, 1947
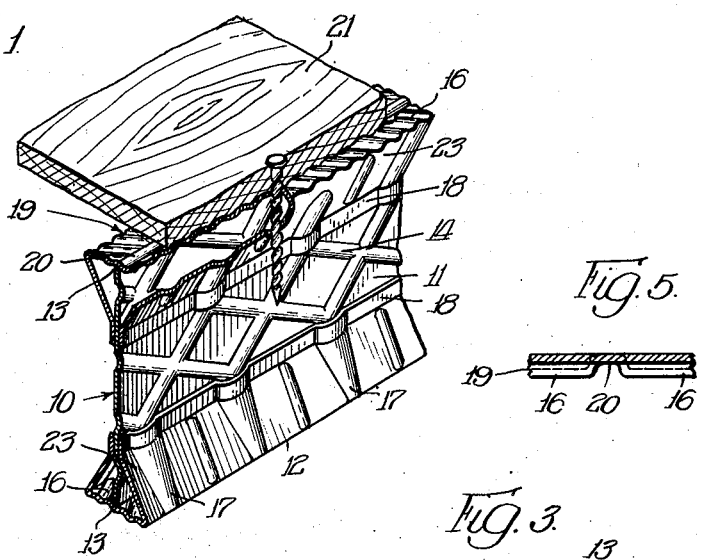
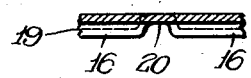
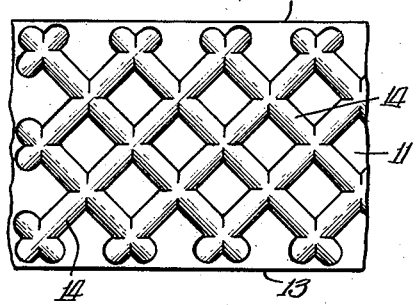
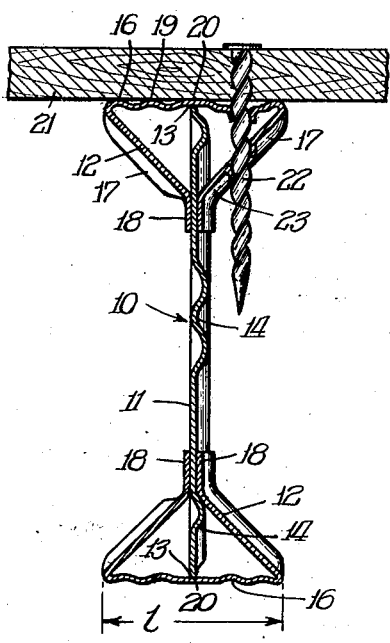
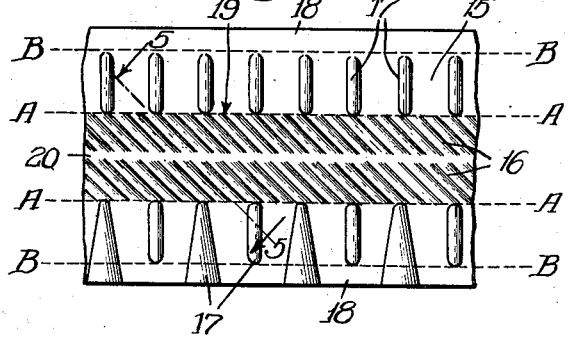
INVENTOR.
George I. Goodwin,
BY
Cromwell, Greist + Warden.

Patented Aug. 5, 1952

2,605,867

UNITED STATES PATENT OFFICE 2,605,867

STRUCTURAL MEMBER

George I. Goodwin, Birmingham, Mich.

Application May 10, 1947, Serial No. 747,282

2 Claims. (Cl. 189—37)

This invention pertains to a metal structural member or section adapted to be employed in building construction. More particularly, the invention provides an improved member of this type adapted to receive fastening means for the ready application thereto of wall siding, flooring, and like surfacing or related materials. In such an adaptation, the improved structure affords a load supporting and nailing surface of notable rigidity and strength.

Various forms of metallic structural members, beams, joists, etc. have heretofore been devised for the reception and support of surfacing and like materials, which are secured thereto by nails or similar fastening elements. In accordance with a well-known type these usually take the form of a composite welded section characterized by a longitudinally extending slot into which a fastening nail is driven and gripped frictionally. Members of this type are usually quite heavy and costly from a material and assembly standpoint and are hard to work with in addition, since in many cases it is impossible to direct the fastening nail with certainty into the gripping slot therefor. Usually this is a hit-or-miss matter.

Furthermore, an inherent defect in such slotted section resides in the fact that a space of substantial width and depth exists between the fastened material and the point at which the fastening nail is engaged in the slot of the structural section. This space will accommodate lateral bending movement of the nail under a load directed transversely of its length, with resultant bending stress in the nail in addition to shear across its axis. In the case of two pieces which are nailed directly to one another in direct surface-to-surface contact, only shearing stress is set up on the nail under such a transverse force or load, and it is evident that the bending tendency in the conventional type of metallic member referred to is a very objectionable feature, inasmuch as it tends to loosen the nail from its frictional seat in the member as well as weaken the nail itself if the load is recurrent.

Moreover, any such transverse force directed parallel to the length of the beam—and the slot therein in which the nail is received—is resisted only by the friction of engagement of the nail in the slot, which is very small. Accordingly the nail is readily bent or shifted along the beam in the direction of the force.

Another type of related member includes as a component a wooden, fibrous or cementitious strip arranged in a groove in the member for furring purposes. This construction is also relatively expensive of production and, moreover, not very reliable in operation.

An object of the invention is to provide a novel metal structural member characterized by an improved sectional formation imparting increased strength and rigidity to the member to sustain impacts and various other types of load without objectionable deflection or distortion, which member incorporates a minimum of material in the interests of lightness in weight and low cost of production.

Another object of the present invention is to provide a metallic structural member adapted for use as a beam, joist, stud, or in any other related application, which is notable for its relative lightness in weight and economy of material, and which, when used as a fastening or furring member, will unfailingly receive and securely hold a fastening nail in a manner to prevent deflection, loosening or displacement of the latter.

A more specific object is to provide a structural member or section having a load supporting and nailing surface of greatly increased rigidity and resistance to deflection, notwithstanding the comparatively light gauge metal of which it is fabricated, due to a novel combination of means for specially shaping and for bracing or sustaining said surface.

A still further object is to provide a structural member of the foregoing description having a nailing surface of novel configuration which not only rigidifies said surface substantially, but also insures unfailing, non-slip engagement with a surface fastening nail, regardless of the positioning or driving angle of said nail, whereby no particular precaution need be taken by the user in placing and driving the latter.

Yet another object is to provide a structural member including a sheet metal web and sheet metal flange elements abuttingly engaged with and supported by the web in such manner as to be much improved in their resistance to deflection under impact or load.

A further object is to provide a structural section of the type referred to above which affords two spaced thicknesses of material for penetration by, and frictional retaining engagement with, a fastening element driven into the same, thereby adding to the resistance of the element to displacement under lateral forces and diminishing the crushing or tearing stress imposed on the penetrated surfaces.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

In the drawings,

Fig. 1 is a fragmentary perspective view partially broken away and in section, illustrating the structural member of the present invention as embodied in a floor joist, for example, and a surfacing member or flooring applied and secured thereto in accordance with the principle of the invention;

Fig. 2 is a fragmentary view in transverse vertical section through the member and surfacing material illustrated in Fig. 1, more clearly illustrating details of construction of the member and the mode of securing the surfacing thereto;

Fig. 3 is a fragmentary face view of a section of the web which is a component part of the novel member;

Fig. 4 is a plan view of one embodiment of the flange material of the member in a flat condition following rolling and prior to the final shaping thereof, the broken lines indicating lines along which the flat strip is bent to produce the generally triangular flange section; and Fig. 5 is a fragmentary view in enlarged section along line 5—5 of Fig. 4.

Referring to the drawings, the assembled structural member is generally designated by the reference numeral 10, being shown for the purpose of the description in an embodiment as a transverse floor joist. Other adaptations thereof as a joist, stud, or, in fact, any other structural form useful in the building and related arts, are of course apparent, even when, as provided by the invention, nailing of surfacing and the like to the form is not contemplated. Similarly, many different alterations in the shape or surface configuration of the member, which do not depart from the principles of the invention, will immediately suggest themselves to those skilled in the art. These are naturally to be regarded as within the intent of the present disclosure, which is merely generally illustrative in character.

The assembled member 10 comprises an upright web, generally denoted 11, and a pair of like flange sections, cappings or shaped marginal portions 12 of generally triangular cross-sectional outline, which are applied to the opposite edges 13 of the web. The material of which the web and flange sections are fabricated is illustrated respectively in Figs. 3 and 4. In each case these elements are rolled as flat sheet steel strips in desired thicknesses. I preferably provide stiffening ribbing 14 in the web 11, since the resultant rigidification of the web enables its fabrication from a lighter gauge of stock; however, it may be desired to omit this feature in some instances. Though I have found the crisscross pattern illustrated to be very effective, the design of the ribbing may be altered within relatively wide limits.

One form of the blank for the flanges 12 is illustrated in Fig. 4 and is designated by the reference numeral 15. It, like the web 11, is produced as a strip in whatever length is called for, being provided with rows of reinforcing and nailing ribs, corrugations or like formations 16 which are shown in a preferred embodiment as being disposed angularly, paralleling one another and spaced equally on either side of the longitudinal center line of the strip-like blank. The depth of these corrugations is of course susceptible of variation but for purpose of illustration may be considered to be at least twice the thickness of the metal of the flange. The purposes and advantages of these formations are hereinafter referred to. The strip-like blank 15, particularly when the web 11 is ribbed, is also provided with shaped lateral ribbing at 17 extending transversely from either outer side of the rows of corrugations 16. Certain of the ribs 17 on one side of the strip extend to the edge thereof and are adapted to register with and accommodate the ribbing 14 adjacent the edges 13 of the web. They thereby enable the opposite marginal areas 18 of the flange blank to be brought into immediately surface-abutting engagement with opposite sides of the web 11 between the raised ribs, when said flange blank is shaped to the generally triangular outline illustrated in Figs. 1 and 2. It will be appreciated that the designs of ribbing 14 and 17 must be coordinated to accomplish such register.

The details of the operation by which blank 15 is shaped to triangular form are not involved in the invention but may be accomplished by any of the well known roll forming or other methods. In the form shown, the section of the blank strip 15 on either side of the rows of corrugations 16 will be bent, in the same direction and through approximately 135°, from the plane of the blank, along lines coinciding approximately with parallel broken lines A—A of Fig. 4. The extreme outer marginal areas 18 of the said sections are bent in the reverse direction into approximate parallelism with one another, along lines corresponding to broken lines B—B. When the flanges or cappings 12 are so shaped, the marginal areas 18 thereof are disposed over and engaged against opposite sides of the web 11, as illustrated in Fig. 2, with the opposed edges 13 of said web falling into the groove 20 (shown in Fig. 5) which is defined between the adjacent ends of corrugationns 16. Said edges therefore lie in abutting engagement with the mid point of the respective corrugated nailing areas generally indicated 19 of said flanges 12. Thus assembly is facilitated by locating the web edges 13 along the narrow groove 20. Furthermore, said groove functions to prevent relative lateral shift between the web edge 13 and the flange section, thereby effecting a mutual reinforcement of said web and flange section, thus strengthening the entire assembly.

The flanges 12 are then united rigidly to the web, as by spot or seam welding at spaced points along the marginal areas 18, to produce a unitary, integrally joined structural member of pronounced strength and rigidity. I preferably apply biasing forces to the edges of the triangular flanges while the flanges are being welded to the web at the marginal areas 18, in a manner to set up a flexing stress in the corrugated nailing area 19 during and after welding. Although this stressing effect is not so pronounced as to distort said surface, it is sufficient to insure a firm engagement of the edges 13 of the web in the central web locating and restraining groove 20, thereby eliminating any possibility of the web edge being laterally displaced from said groove. Accordingly, the web and nailing surface mutually assist in supporting one another in a very effective manner.

The rigidity of the nailing surface or area 19 is of significance in this invention. It is developed in two ways. First of all, the surface is serrated, ribbed or corrugated to form a series of parallel beam structures of length *l* (see Fig. 2) whose depth in the direction of load is thus made greater than the thickness of the material. Secondly, the nailing surface is made more rigid by the center support of the web 11 along its edge 13, reducing the beam length by half. It is thus to be seen that if a beam is provided whose effective depth is twice that of the material of which it is made, and whose length is halved, the rigidity of the nailing surface is increased at least 64 times as compared to a surface of the same metal thickness but lacking the ribbed feature and the center support. Hence, it is possible to fabricate the member from light weight stock and still afford all the strength and rigidity desired. It will be appreciated that the corrugations 16 provide adequate thickness or beam depth for such rigidity without decreasing the penetrability of the nailing surface. I have found that a flat, uncorrugated nailing surface, if the material thereof is sufficiently thin for reasonably easy penetration by the nail, is unacceptably weak from a load and impact sustaining standpoint. Conversely, if the material is sufficiently thick to afford adequate rigidity, it is not readily penetrated by the nail. Thus, the configuration of the nailing surface in the manner described makes it possible to combine desired rigidity and nailability in a structural section of comparatively light weight.

The reference numeral 21 generally designates a plank, floor board or any other surfacing element which is applied to one flange 12 of the member 10 and secured thereon by a fastening nail 22. This nail is preferably of a conventional, twisted self-threading type, although it is of course contemplated that plain nails may also be employed.

It is unnecessary for the workman to take particular care in driving the nails inasmuch as they will unfailingly engage and penetrate the adjacent load supporting surface of flange 12, as well as the lower, inwardly inclined strut portion 23 of the flange. Reference has been made to the fact that these portions are disposed at an angle of about 45° to nailing surface 19 in the forming of the flange. This angular relationship has been found to be a successful one in practice and results in unfailing penetration of nail 22 through both the surface 19 and the inclined portion. However, the angle stated is not critical and may be varied considerably, so long as it is not made so great that the nail will slide along said portion without piercing the same.

Double penetration of the flange and frictional gripping of the nail at two locations spaced along the nail length eliminates likelihood of lateral displacement and loosening thereof. Moreover, the crushing or tearing stress to which the nail engaging surfaces of the beam are subjected is greatly reduced. The reason for this is that if a nail penetrating but a single thickness of beam material is subjected to a lateral force tending to push the nail over, the length of the arm of the couple exerted by the material to resist lateral movement of the nail is only equal to the thickness of the material. Therefore, because of this relatively short couple arm the resistance force must necessarily be higher to meet and overcome the applied force, i. e., the crushing or tearing stress on the single thickness of material is correspondingly high. However, a nail which is driven through two surfaces spaced apart in the direction of the nail length and subjected to the same lateral applied force is resisted by a couple whose moment arm is of greatly increased length, with the result that a considerably smaller load is borne at the two nail engaging surfaces of the beam.

Coupled with the high degree of rigidity imparted to the nailing surface by the ribbing or corrugating of the same and central bracing of said surface on the beam web, which prevents collapse of said surface under nailing impact, the last described features produce a structural member of desirable physical characteristics in all respects.

From these considerations it is obvious that a structure in which the nail penetrates but a single surface is relatively weak as compared with the present improved construction.

As illustrated in Fig. 2, the corrugation of the nailing surface 19 tends to result in formation of a frictional nail gripping collar of substantial marginal gripping area adapted to frictionally engage a nail when penetrated thereby. This enlarged contact surface provides added resistance to crushing or tearing when a transverse load is applied to the nail above the surface.

The ribbing 16, in addition to rigidifying the nailing surface, insures against the nail's slipping laterally prior to penetrating said surface. Moreover, inasmuch as the board or timber 21 is normally placed either at a right angle to or paralleling the length of the member 10 in the use of the latter, the additional feature of inclining the corrugations relative to said length provides components of resistance to such slipping of the nail longitudinally of the grain of the wood of the board, whether the latter is arranged longitudinally or transversely of member 10. Hence, any tendency of the nail to shift in a direction likely to result in splitting of the board or timber is effectively counteracted.

It will be noted that the distance between plank 21 and nailing surface 19 is negligible. This eliminates any tendency of the nail to bend when subjected to a transverse load at this point, and, in conjunction with the double engagement of the nail at surface 19 and portion 23, prevents the nail from wiggling loose from its frictional anchor in the member 10. The sole stress borne by the nail due to any transverse load is one of shear, due to the fact that transverse forces thereon are strongly resisted by the double gripping engagement referred to. In these respects, present metal nailing members are further improved on.

The member utilizes a minimum of material, i. e., its weight is approximately two-thirds that of members of equivalent rating now on the market, yet it sustains bending loads about either vertical or horizontal axis and torsional loads with better effect. Needless to say, the decreased weight and bulk of the present structural member decrease shipping and storage costs in the same way that they minimize material and assembly costs.

I believe it is entirely novel with me to provide a structural member of the above description characterized by a web portion and a hollow marginal portion or flange, said last named portion being fixedly associated with the web portion and in abutting engagement with an edge thereof, so as to be in effect halved in beam length and greatly increased in rigidity, particularly in association with ribbing at said portion to compound the rigidification. I also consider it broadly novel with me to provide a member of the foregoing character, in which said marginal portion or flange presents two surfaces which in general intersect a plane paralleling the web portion and are adapted for penetration by and frictional engagement with a fastening element lying generally in said plane. Therefore, I desire that the invention be construed no more narrowly than is reasonably indicated by the scope of the appended claims.

I claim:

1. A metallic beam-like structure to which other members are adapted to be secured by nailing, comprising a longitudinally extending sheet metal web which terminates along one margin in a load-bearing edge disposed substantially in the plane of said web, and a longitudinally extending strip bent to provide a hollow capping of generally triangular cross section and secured to said web, said capping having a substantially flat center face and being arranged with said center face disposed at a right angle to the plane of said web and in contact intermediate its side edges with said load-bearing edge, thereby to define a right-triangular capping section on either side of said web, the side faces of said sections being substantially planar between side margins of said center face and their points of securement to said web and converging in substantially straight lines toward said web, the margins of said capping sections being bent adjacent the web and secured in face-to-face engagement with the respective opposite sides of said web, said capping being of single ply thickness and its center face being supported only by said load-bearing edge and said planar side faces, whereby to present a readily penetrable nailing thickness, both in said center face and, in downwardly spaced relation thereto, in said side faces, said center face being inwardly indented on either side of its line of support by said load-bearing edge to define bands of closely spaced corrugated formations, said bands of formations being transversely spaced from one another to define a longitudinally extending groove along the inner surface of said center face which is in engagement with said load-bearing edge to prevent transverse slip of the web.

2. A metallic beam-like structure to which other members are adopted to be secured by nailing, comprising a longitudinally extending sheet metal web which terminates along one margin in a load-bearing edge disposed substantially in the plane of said web, and a longitudinally extending strip bent to provide a hollow capping of generally triangular cross section and secured to said web, said capping having a substantially flat center face and being arranged with said center face disposed at a right angle to the plane of said web and in contact intermediate its side edges with said load-bearing edge, thereby to define a right-triangular capping section on either side of said web, the side faces of said sections being substantially planar between side margins of said center face and their points of securement to said web and converging in substantially straight lines toward said web, the margins of said capping sections being bent adjacent the web and secured in face-to-face engagement with the respective opposite sides of said web, said capping being of single ply thickness and its center face being supported only by said load-bearing edge and said planar side faces, whereby to present a readily penetrable nailing thickness, both in said center face and, in downwardly spaced relation thereto, in said side faces, said center face being inwardly indented on either side of its line of support by said load-bearing edge to define bands of closely spaced corrugations disposed at an angle to said line of support, said bands of corrugations being transversely spaced from one another to define a longitudinally extending groove along the inner surface of said center capping face which is engaged by said load-bearing edge to prevent transverse slip of the web.

GEORGE I. GOODWIN.

REFERENCES CITED

The following references are of record in the file of this patent:

UNITED STATES PATENTS

| Number | Name | Date |
|---|---|---|
| 854,391 | Voshardt | May 21, 1907 |
| 937,714 | Palmer | Oct. 19, 1909 |
| 1,204,955 | Day | Nov. 14, 1916 |
| 1,935,574 | Munroe | Nov. 14, 1933 |
| 1,949,818 | Tarbox | Mar. 6, 1934 |
| 2,187,280 | Olson | Jan. 16, 1940 |
| 2,246,578 | Salardi | June 24, 1941 |

FOREIGN PATENTS

| Number | Country | Date |
|---|---|---|
| 148,698 | Great Britain | 1920 |